April 20, 1926.

T. S. JAMES 1,581,954

CHANGE SPEED GEAR FOR MOTOR CARS

Filed May 18, 1925      2 Sheets-Sheet 2

Inventor
T. S. James
by

Patented Apr. 20, 1926.

1,581,954

UNITED STATES PATENT OFFICE.

THOMAS SPENCER JAMES, OF LEIGH-ON-SEA, ENGLAND.

CHANGE-SPEED GEAR FOR MOTOR CARS.

Application filed May 18, 1925. Serial No. 31,224.

*To all whom it may concern:*

Be it known that I, THOMAS SPENCER JAMES, a British subject, residing at "Curradaile," Sandleigh Road, Leigh-on-Sea, in the county of Essex, England, have invented certain new and useful Improvements in Change-Speed Gears for Motor Cars, of which the following is a specification.

This invention relates to variable speed gears suitable for different purposes but which will be more particularly described as applied to motor road vehicles.

The chief feature of the invention is that the drive from the engine is taken by a shaft carrying a worm positioned between two or more pairs of adjacent but oppositely set coaxial crown wheels of different diameters, the said shaft being laterally displaceable at the end carrying the worm and so that the worm can simultaneously engage the members of each of a pair of crown wheels and convey the same drive to each such member. A clearance or neutral space is preferably left between the crown wheels on each side and the said wheels are suitably connected to the shaft to be driven; in the case of a motor car, as by mounting the crown wheels on opposite faces of the differential box of the driven axle of the vehicle.

The method employed for shifting the worm-shaft may be as desired but I prefer to use one of the screw-actuated kind hereinafter described and for purpose of reverse driving I may employ any known or convenient clutch device such as dog clutch gear of the kind comprising a box or casing in which are three bevel wheels and a sliding lever-operated dog or clutch block such device being well known in principle.

I will now describe my invention with reference to the accompanying drawings which are largely diagrammatic and show a form suitable for a motor car.

Figure 1:
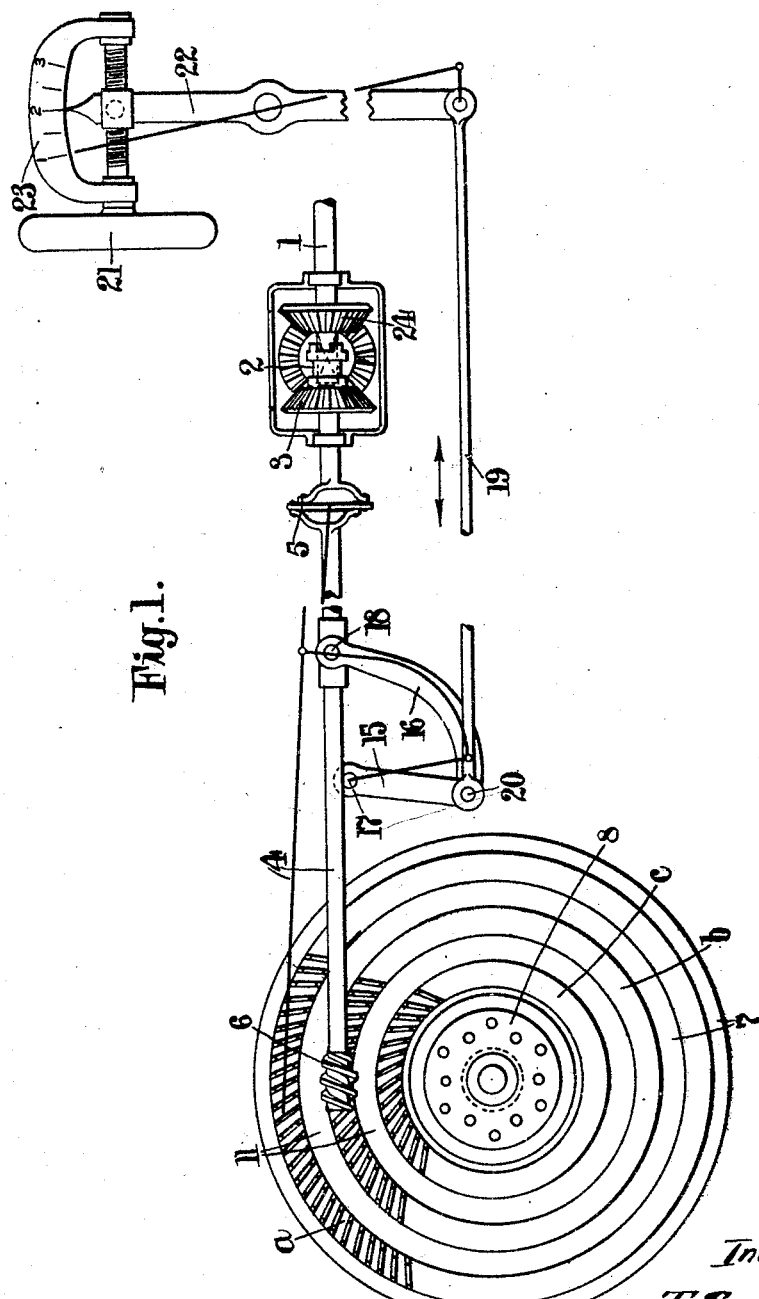
Fig. 1 is a side view of substantially the whole mechanism.

In this example the drive from the engine, not shown, is by shaft 1 through dog clutch 2 and bevel wheel 3 fixed to shaft 4 in which is a flexible coupling 5. The end of the shaft 4 carries a worm 6 positioned between two cheeks 7, 7 fixed to the outside of the differential box 8 from which small portions of the back axle are seen at 9.

The cheeks have three annular grooves indicated at 10 and in each of these grooves a worm wheel or worm ring is arranged. These worm rings are in pairs as indicated at $a, a, b, b$ and $c, c$ with annular spaces 11 between them.

Any suitable means may be employed to hold the worm rings in place and they may be rigid with the cheeks but, as shown in the drawings I prefer to make the said rings capable of some limited rotary movement in relation to the cheeks and against spring compression. For this purpose I provide a stop such as 12 in each groove and a projection or lug such as 13 on the back of each ring. A spiral spring 14 is placed in the groove behind the ring and is normally expanded but upon initial movement of the ring the spring will be compressed between the stop and the projection.

Figure 2:
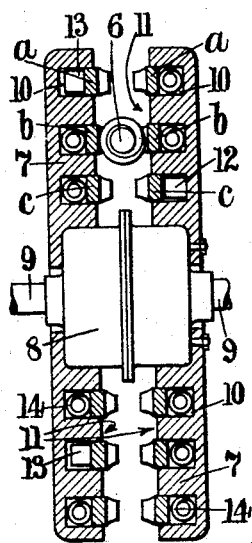
Fig. 2 is an end sectional view of the gear proper.

With the worm opposite a space 11 the drive of the engine is inoperative on the worm rings but when the shaft 4 is shifted so that the worm engages one of the pairs of rings, say the pair $b, b$ as shown in Fig. 2 the drive of the engine is taken by these rings and communicated to the differential box.

For the purpose of shifting the shaft I have shown a two-arm lever 15—16 pivoted at 17 and connected at 18 to the shaft. A rod 19 is pivotally connected at 20 to the lever 15—16 and can be lengthwise shifted by hand wheel 21 through the lever 22. This hand wheel would be conveniently arranged for the driver of the car and it will be evident that by turning it he can easily shift the shaft 4 and bring the worm into engagement with any desired pair of worm rings or wheels. The scale indicator at 23 will show how the gear stands. For reverse drive the dog clutch will be pushed into engagement with the wheel 24, in well known manner.

I have shown the lever 15—16 away from the gear but in practice the pivot 17 may be conveniently coaxial with the shaft 9 and the end of the part 15 may be of ring form encircling the shaft and the lever may be duplicated one on each side having a common connection, such as 18, to the shaft 4.

Figure 4:
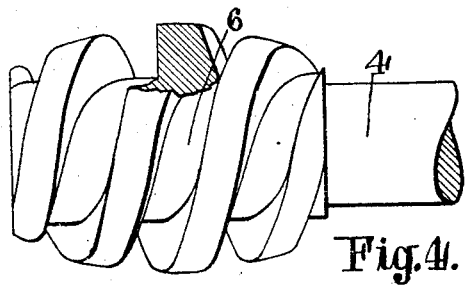
Fig. 4 shows a preferred form of worm.
Figure 3:
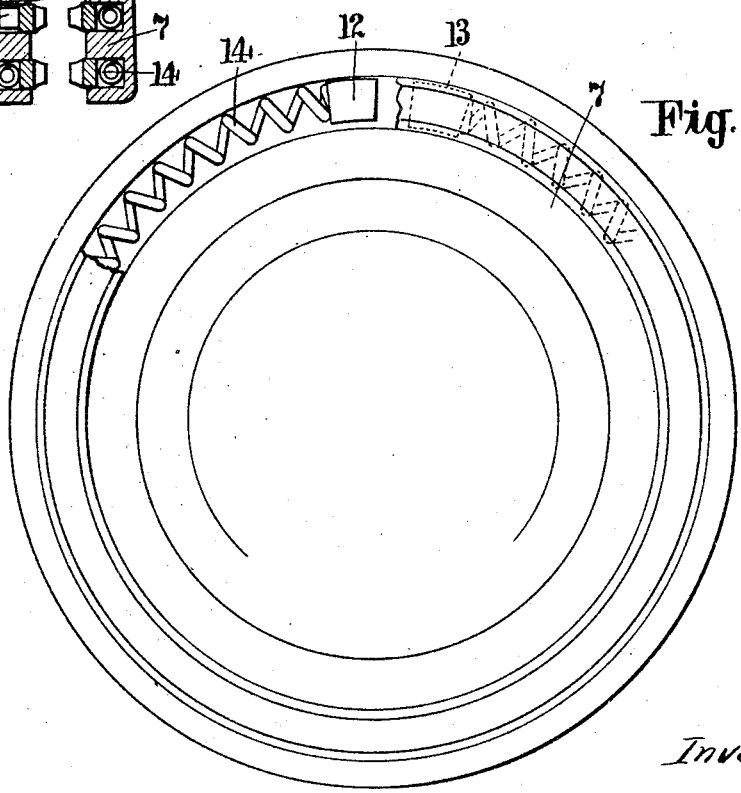
Fig. 3 is a side view on a larger scale of one of the gear wheels.

The worm shown in Fig. 4 is of substantially globular form with the worm thread itself of double form with one face about vertical and the other inclined.

When the worm is moved from a neutral space 11 into engagement with one of the pairs of rings the springs behind the rings will be expanded and will cushion the engagement, said springs being then more or less compressed according to the load and at all times tending to prevent jar.

It will be evident to those skilled in the art that various modifications can be made within the spirit of the invention and for the purpose for which the gear may be required.

What I claim is:—

1. Change speed gearing, comprising opposing members, concentrically arranged worm rings mounted in grooves formed in the members to provide pairs of opposing worm wheels, a shaft arranged between the members and carrying a worm for simultaneous cooperation with any pair of worm wheels, means for operating the shaft for cooperation with a selected pair of worm wheels, and means for permitting a limited movement of each of the worm wheels independent of the members.

2. Change speed gearing, comprising spaced members formed on their inner surfaces with annular concentric channels, a worm ring movably mounted in each of the channels, spring means for limiting the movement of the ring in the channel, and a drive member for simultaneously cooperating with similar rings of the respective members.

In testimony whereof I affix my signature.

THOMAS SPENCER JAMES.